US006984173B1

(12) United States Patent
Piechowiak et al.

(10) Patent No.: US 6,984,173 B1
(45) Date of Patent: Jan. 10, 2006

(54) SLOT MACHINE USING A COUNT VALVE TO AWARD BONUS GAME

(75) Inventors: Robert J. Piechowiak, Las Vegas, NV (US); Curtis J. Crawford, Las Vegas, NV (US)

(73) Assignee: Multimedia Games, Inc., Austin, TX (US)

( * ) Notice: Subject to any disclaimer, the term of this patent is extended or adjusted under 35 U.S.C. 154(b) by 0 days.

(21) Appl. No.: 09/116,425

(22) Filed: Jul. 15, 1998

Related U.S. Application Data

(63) Continuation-in-part of application No. 08/727,805, filed on Oct. 7, 1996, now Pat. No. 6,012,982, which is a continuation-in-part of application No. 08/200, 121, filed on Feb. 22, 1994, now Pat. No. 5,580,309.

(51) Int. Cl.
*A63F 13/00* (2006.01)

(52) U.S. Cl. ............................ 463/20; 463/21; 463/25

(58) Field of Classification Search ............ 463/16–17, 463/19–20, 27, 21, 25; 273/138.1, 139, 143 R, 273/339

See application file for complete search history.

(56) References Cited

U.S. PATENT DOCUMENTS

| | | | | |
|---|---|---|---|---|
| 3,770,269 A | | 11/1973 | Eder | 273/1 E |
| 4,508,345 A | * | 4/1985 | Okada | 273/143 R |
| 4,572,509 A | * | 2/1986 | Sitrick | 273/85 |
| 4,837,728 A | | 6/1989 | Barrie et al. | 364/412 |
| 4,871,171 A | | 10/1989 | Rivero | 273/138 A |
| 5,249,800 A | * | 10/1993 | Hilgendorf et al. | 273/138 A |
| 5,280,909 A | * | 1/1994 | Tracy | 273/138 |
| 5,393,057 A | | 2/1995 | Marnell, II | 273/85 CP |
| 5,393,061 A | | 2/1995 | Manship et al. | 273/143 R |
| 5,401,023 A | * | 3/1995 | Wood | 273/85 |
| 5,580,309 A | | 12/1996 | Piechowiak et al. | 463/16 |
| 5,586,766 A | | 12/1996 | Forte et al. | 273/309 |
| 5,722,891 A | * | 3/1998 | Inoue | 463/20 |
| 6,190,255 B1 | * | 2/2001 | Thomas et al. | 463/20 |

FOREIGN PATENT DOCUMENTS

| | | | |
|---|---|---|---|
| AU | 209606 | | 5/1956 |
| AU | 589 158 | | 10/1989 |
| AU | B-13023/92 | * | 3/1992 |

(Continued)

*Primary Examiner*—John M. Hotaling, II

(57) ABSTRACT

The invention relates to a bonus feature in a slot machine. This bonus feature may be used in stand-alone slot machines as well as linked slot machines. The preferred embodiment is directed to a system of linked gaming machines. In one embodiment, each linked gaming machines operates like a conventional machine where the generation and display of certain combinations of symbols within a first group of combinations provide awards to the individual players whose machines generate such combinations. In addition to this normal mode of play, a bonus feature is added where the generation and display of combinations of symbols within a second group of combinations are used in the awarding of a bonus. In such a feature, the generation of a combination of symbols within the second group of combinations is used in a bonus award game. The display on each machine may be a video display that displays the main game as well as the bonus game. Since both games can be run using the same electrical circuitry (e.g., memory and a processor), no additional hardware is needed. A single machine, as opposed to linked machines, may incorporate all elements to play the main game and the bonus game. This is equivalent to a single machine in a linked system being operated.

11 Claims, 10 Drawing Sheets

FOREIGN PATENT DOCUMENTS

| | | | |
|---|---|---|---|
| EP | 0 219 305 A2 | | 4/1987 |
| EP | 0 443 420 A2 | | 8/1991 |
| EP | 0 444 932 A2 | | 9/1991 |
| EP | 0 449 433 A2 | | 10/1991 |
| GB | 2072395 | * | 9/1981 |
| GB | 2 086 632 A | | 5/1982 |
| GB | 2262642 | * | 6/1993 |
| WO | WO 96/24421 | | 8/1996 |

* cited by examiner

* action controlled by individual machine
\# action controlled by common controller

SLOT MACHINE USING A COUNT VALVE TO AWARD BONUS GAME

CROSS-REFERENCE TO RELATED APPLICATIONS

This is a continuation-in-part of U.S. application Ser. No. 08/727,805, filed Oct. 7, 1996 now U.S. Pat. No. 6,012,982, entitled BONUS AWARD FEATURE IN LINKED GAMING MACHINES HAVING A COMMON FEATURE CONTROLLER, which is a continuation in-part of U.S. application Ser. No. 08/200,121, filed Feb. 22, 1994, now U.S. Pat. No. 5,580,309, entitled LINKED GAMING MACHINES HAVING A COMMON FEATURE CONTROLLER.

FIELD OF THE INVENTION

The present invention relates to electronic gaming devices. More particularly, the present invention relates to a bonus available to one or more electronic gaming machines.

BACKGROUND OF THE INVENTION

Modern gaming machines are typically electronically controlled, as opposed to mechanically controlled. For example, U.S. Pat. No. 4,095,795 to Saxton et al., incorporated herein by reference, discloses a slot machine having a computer which randomly generates a series of numbers corresponding to stopping positions of each reel in the machine. After causing the reels to rotate for a period of time, the machine then stops the reels at their previously determined stopping positions.

This general type of computer controlled gaming machine easily allows similar gaming machines to be electronically linked together to share a common jackpot. This is because the final game results and the jackpot award can be electronically communicated between a central jackpot controller and the various linked gaming machines. Progressive jackpot gaming systems, comprised of one or more interconnected gaming machines which award a progressive jackpot award, are well known. By allowing players to win a large progressive jackpot award in addition to the customary payout for winning combinations, the players enjoy a heightened interest and enthusiasm in the gaming machines. This heightened enthusiasm translates into higher revenue for gaming machine proprietors. U.S. Pat. No. 4,837,728 to Barrie et al., incorporated herein by reference, describes one such progressive gaming system comprised of linked slot machines. The circuitry and software used to fabricate and operate these conventional linked gaming machines are well known to those skilled in the art.

SUMMARY

The invention relates to a bonus feature in a slot machine. This bonus feature may be used in stand-alone slot machines as well as linked slot machines. The preferred embodiment is directed to a system of linked gaming machines.

In one embodiment, a system of linked gaming machines is disclosed where each of the linked gaming machines is connected to a common controller. In a normal mode of play, each of the linked gaming machines operates like a conventional machine where the generation and display of certain combinations of symbols within a first group of combinations provide awards to the individual players whose machines generate such combinations.

In addition to this normal mode of play, a bonus feature is added where the generation and display of combinations of symbols within a second group of combinations are used in the awarding of a bonus. In such a feature, the generation of a combination of symbols within the second group of combinations is used by a central controller to build up a pooled bonus value based upon the number of occurrences and the values of the combinations of symbols within the second group of combinations generated by all the linked gaming machines. Displaying these combinations within the second group of combinations may also result in an instant win for that particular player.

When a player hits a combination within the second group of combinations which causes the accumulated bonus value to meet or exceed a predetermined value, a bonus award is given to the player which caused the threshold to be exceeded. Thus, all players of the linked gaming machines add to the common pool by their individual machines generating combinations within the second group of combinations, and only one player may win the pool.

This is distinguished from the prior art progressive jackpot machines which accumulate a pool based on the number of times the linked gaming machines have been played and award the pool to a player based on a specific combination of symbols being generated.

A common display or a display on each machine displays the accumulated value of the combinations within the second group of combinations generated by all the linked gaming machines. The display on each machine may be a video display that displays a main game as well as a bonus game. Since both games can run using the same electrical circuitry (e.g., memory and a processor), no additional hardware is needed.

In the preferred embodiment, to discourage players from not playing any of the linked gaming machines until the accumulated bonus value is near the threshold, each individual machine has an independent hit counter which is incremented based upon the number of occurrences of combinations within the second group of combinations by that particular machine. The player may use the value in his/her individual hit counter in order to exceed the award threshold for the bonus award.

DETAILED DESCRIPTION OF THE PREFERRED EMBODIMENTS

Figure 1:
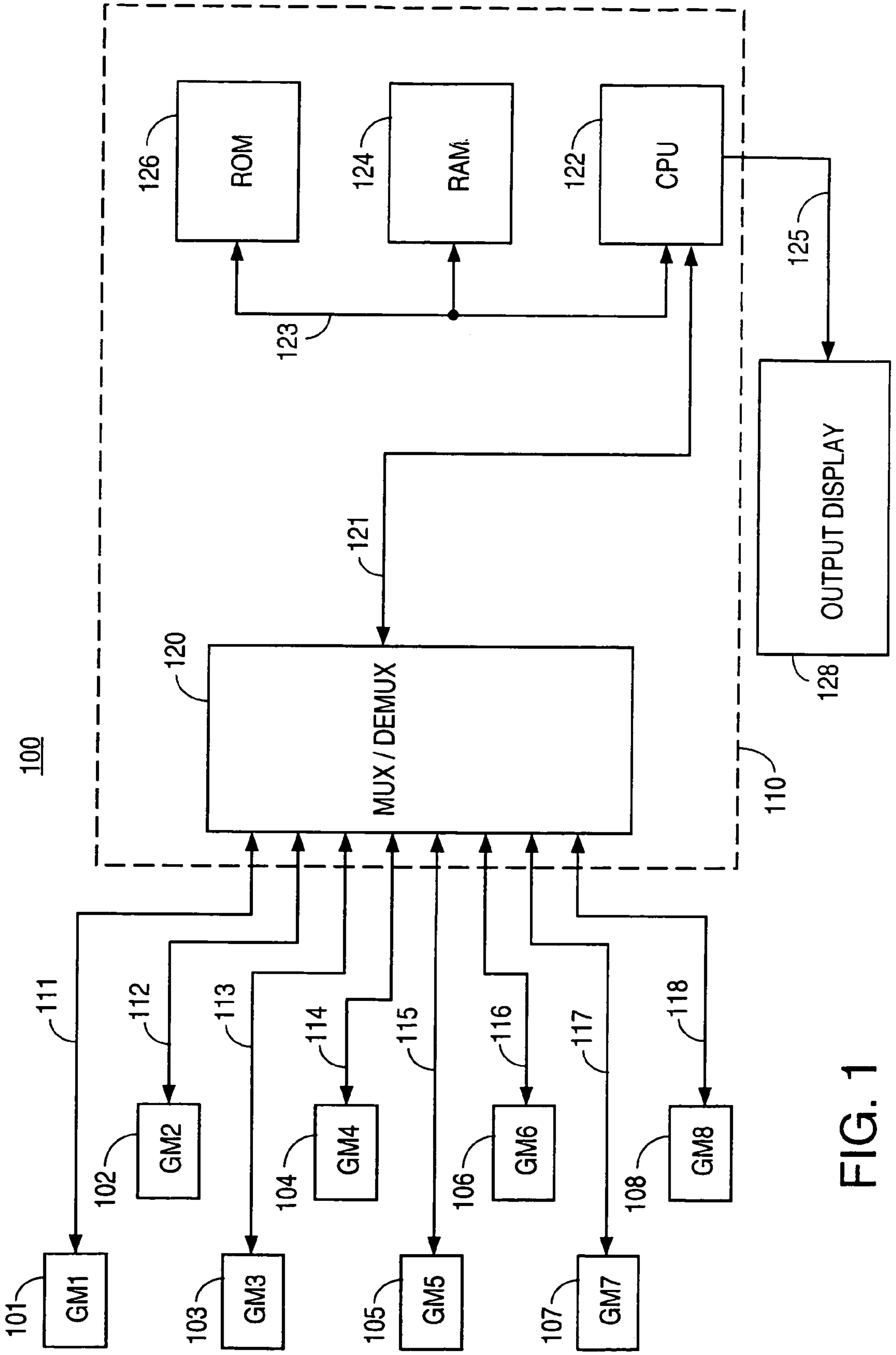
FIG. 1 illustrates one embodiment of a circuit which may be used to implement the present invention.

FIG. 1 illustrates a linked gaming system 100. Other circuitry for implementing the system may also be used. The system 100 includes linked gaming machines 101–108 (which may use circuitry similar to conventional electronically operated slot machines), multiplexer/de-multiplexer circuit (MUX) 120, central processing unit (CPU) 122, random access memory (RAM) 124, read only memory (ROM) 126, and output display device 128. MUX 120 may be replaced with an address/data bus and suitable decoders within the gaming machines 101–108 so that the gaming machines 101–108 can be addressed using digital codes. The circuit within the dashed line will be referred to as a feature controller 110.

Linked gaming machines 101–108 transmit game information to and receive feature information from feature controller 110 through MUX 120 (or a suitable address/data bus) via bi-directional communication lines 111–118. Such game information may include digital codes representing a final displayed combination of symbols in a slot machine. Such digital codes are normally generated in conventional slot machines for addressing an award table stored in a memory in the slot machine. CPU 122 controls MUX 120 and receives/transmits data from/to the gaming machines 101–108 via communication lines 121.

CPU 122, RAM 124, and ROM 126 are connected together via communication lines 123 and control certain features of gaming system 100. RAM 124 is used to temporarily store data generated by CPU 122. CPU 122 is coupled to and controls output display 128 via lines 125. Instead of the common output display 128, each of the linked gaming machines 101–108 may have an individual display which displays the current status of the feature as well as information conventionally displayed by such displays.

The operation of feature controller 110 is controlled by a program stored in ROM 126. The circuitry used in feature controller 110 to carry out the programmed instructions would be known by those skilled in the art after reading this disclosure.

Figure 2:
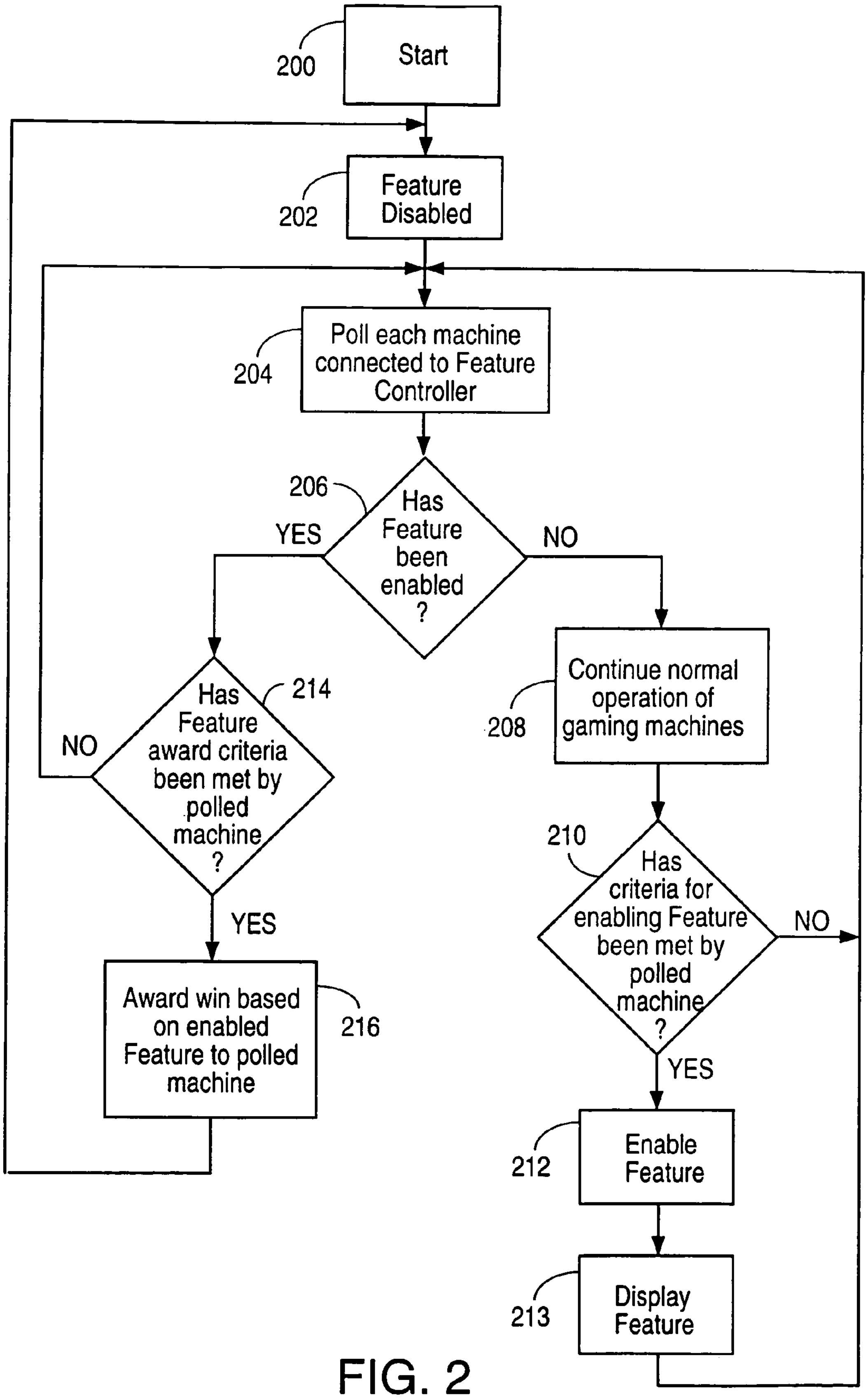
FIG. 2 is a flowchart which shows the basic steps used in one embodiment of the linked gaming machine system.

FIG. 2 is a flow chart illustrating an operation of one embodiment of the linked gaming system 100 of FIG. 1. Such an operation may be controlled by a program stored in ROM 126.

The system 100 is powered up in a start step 200. During normal operation of the gaming system 100, feature controller 110 disables one or more of the particular features under the command of the feature controller 110 (step 202). Gaming machines 101–108 may operate independently of each other and independently of feature controller 110 during this normal operation mode and award wins based upon a normal payout criteria stored in either ROM 126 of feature controller 110 or in a memory (i.e., an award table) contained within each of the linked gaming machines. Feature controller 110 periodically polls each of the gaming machines 101–108, using MUX 120 (or an address/data bus) and using conventional polling techniques, for game results generated in each of the linked gaming machines (step 204). Polling may be performed by sequentially accessing the gaming machines 101–108 in the system and reading the current game results. If the feature has not yet been enabled (step 206) by the feature controller 110, gaming machines 101–108 continue normal operation (step 208).

In step 210, feature controller 110 compares the game results of each gaming machine 101–108 polled to feature enabling criteria stored in ROM 126 (or elsewhere) to determine whether one or more predetermined features should be enabled. The feature enabling criteria may consist of any of a variety of conditions. For example, in one embodiment, a criterion for enabling the feature may be a specified number of occurrences (including one) of a predetermined combination of indicia displayed by the gaming machines 101–108. Thus, for example, the feature may be enabled for a system of linked slot machines when four like symbols have been displayed a total of four times by the linked slot machines.

If the feature controller 110 determines in step 210 that the feature enabling criteria has not been met (e.g., the game results indicate that four-of-a-kind have not yet been generated four times by linked gaming machines 101–108), the feature remains disabled and the linked gaming machines 101–108 are again polled (step 204). Steps 204, 206, 208, and 210 are repeated until the game results generated by one or more of linked gaming machines 101–108 meet the feature enabling criteria.

If the feature enabling criteria has been met (step 210) by the game results, feature controller 110 enables the feature (step 212), and this enabled feature is now prominently displayed (step 213) by output display 128 to attract new players and heighten excitement. At this point, the feature is made available to all linked gaming machines 101–108. The various players now play the gaming machines 101–108 having the enabled feature. Feature controller 110 again polls each of linked gaming machines 101–108 (step 204) and, with the feature now enabled (step 206), determines whether the feature award criteria stored in ROM 126 has been met by any of the polled machines (step 214). Feature controller 110 then awards a win, based upon the enabled feature, to the first linked gaming machine to generate a game result which matches the feature award criteria (step 216). In one embodiment, the feature operates to double the award normally associated with a certain game result (e.g., four-of-a-kind).

In another embodiment, the enablement of the feature only enables the features on those machines which are currently being played or those machines which have been played within the last 30 seconds or other short time period.

Instead of the feature controller 110 determining a win based on the polled game results and communicating the award amount to the gaming machine, feature controller 110 could modify the award table in each of the gaming machines 101–108, via communication lines 111–118, to reflect the enable feature. The gaming machine would then compare its game result to the award table and then provide a corresponding award. In this embodiment, feature controller 110 would still poll the various gaming machines to determine whether the feature should be enabled or disabled in the various award tables.

After a match is found and a win awarded (step 216) in accordance with the feature, the feature is then disabled (step 202) and all linked gaming machines 101–108 return to normal operation. Gaming machines 101–108 will remain in normal operation until feature controller 110 again enables the feature (step 212).

If no game result of linked gaming machines 101–108 matches the feature award criteria, steps 204, 206, and 214 are repeated until one of linked gaming machines 101–108 is awarded a win based upon the feature. In another embodiment, the feature is automatically disabled after a period of time. This period of time may be displayed by display 128.

Both the feature award criteria and the feature enabling criteria may embody various conditions in addition to those previously discussed. For instance, in some embodiments, the feature enabling criteria stored in ROM 126 (or elsewhere) may be a predetermined lapse of time between periods during which the feature has been disabled; for example, feature controller 110 may enable the feature 10 minutes after the feature was last disabled.

To attract more non-player interest in the gaming machines, the feature enabling criteria may be a predetermined lapse of time during which one or more of linked gaming machines 101–108 has not been played. And in yet another embodiment, the feature is enabled in a purely random manner.

Similarly, the feature award criteria stored in ROM 126 may take on many forms. For example, the feature award criterion may be the display by one of the linked gaming machines 101–108 of a certain combination of symbols (e.g., four-of-a-kind), in which case the feature will award an enhanced amount (i.e., a bonus). The feature may even offer the gaming machine players a greater variety of winning possibilities, thereby increasing player interest in the linked gaming system 100. Hence, the feature award criteria may be a special or randomly chosen combination of symbols which will incur an enhanced award being given to the player. In another embodiment, the feature may provide a more nonconventional award by the linked gaming device meeting the feature award criteria, such as free game credits or other prizes.

Figure 3:
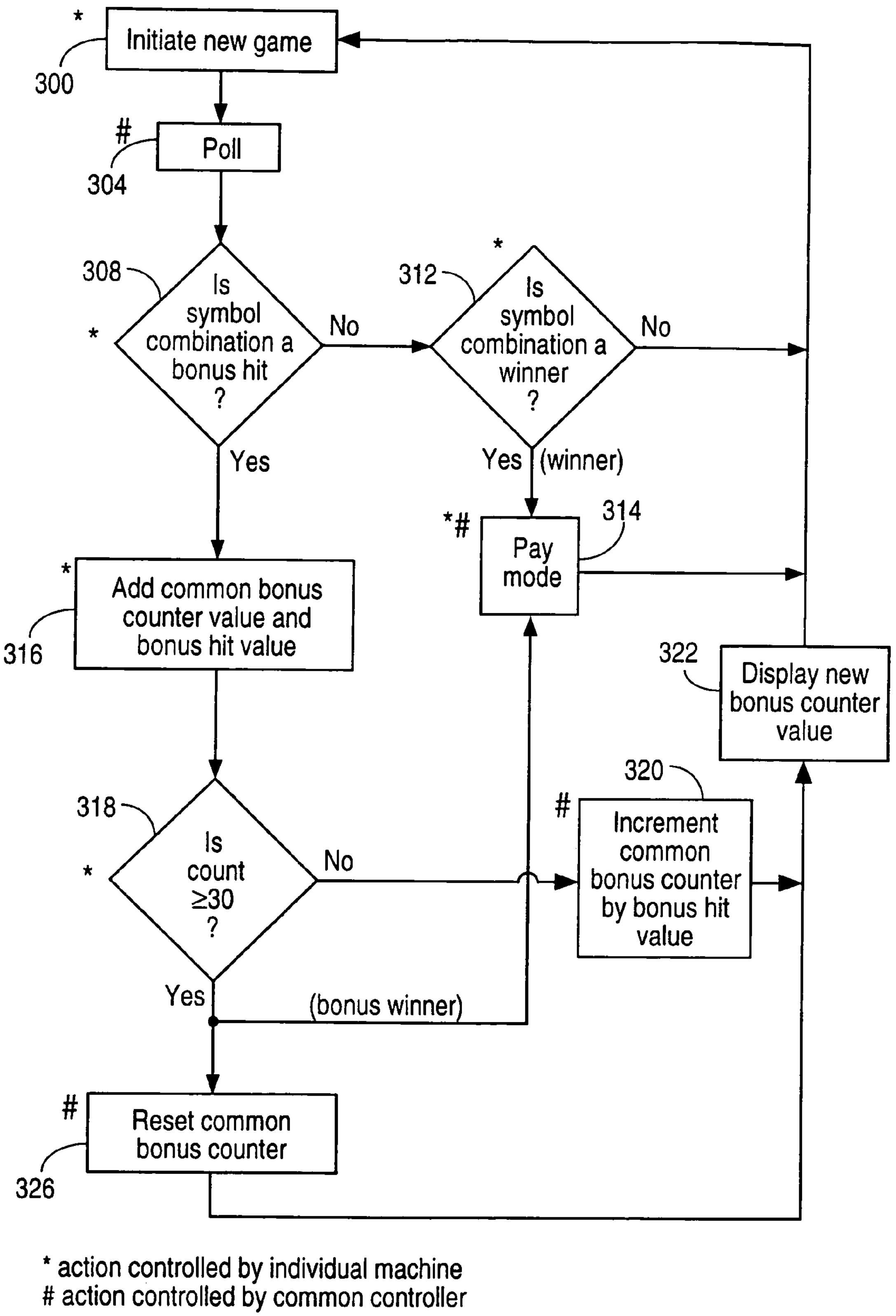
FIG. 3 is a flowchart which shows the basic steps used in an alternative embodiment of the linked gaming machine system.
Figure 4:
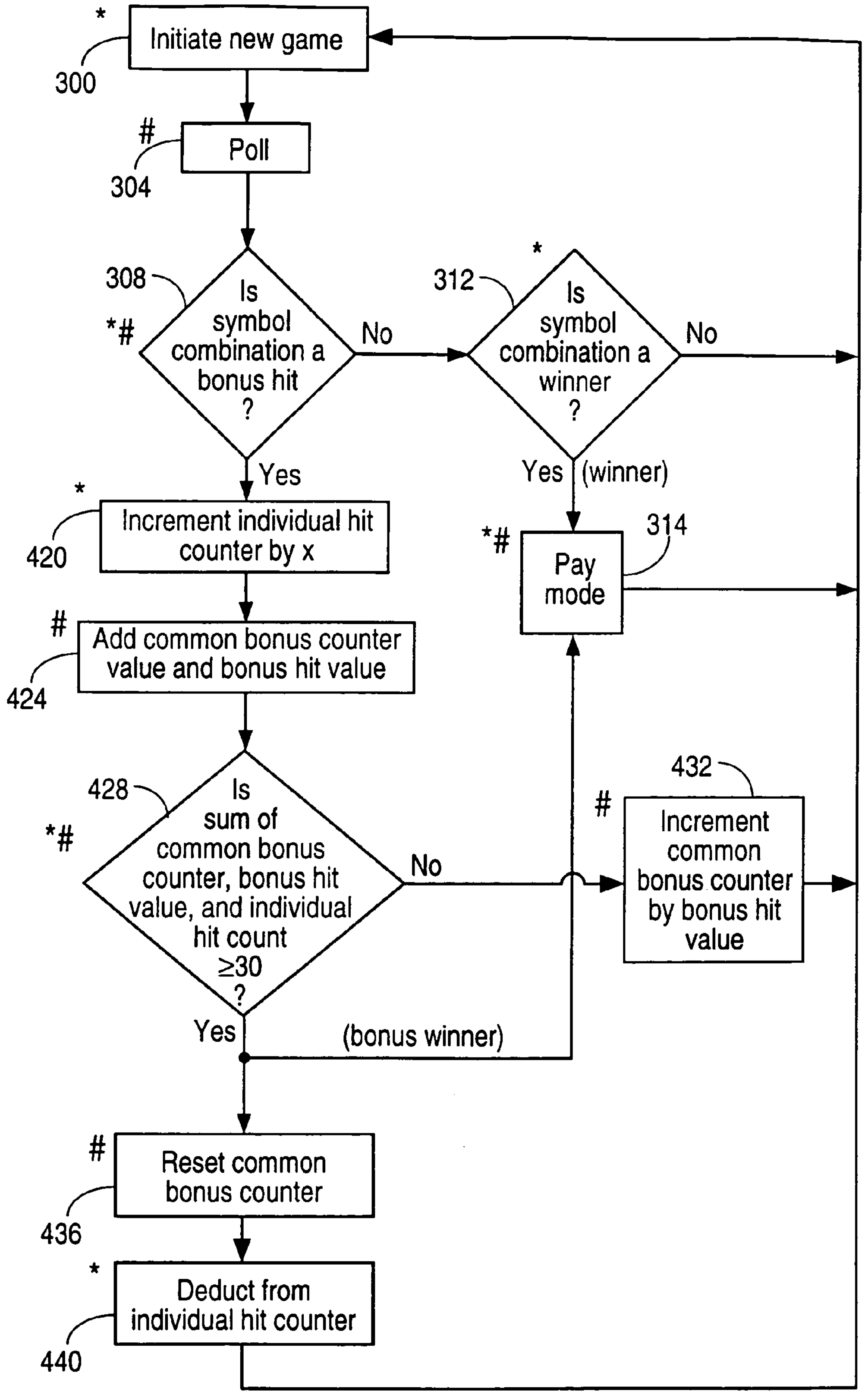
FIG. 4 is a flowchart of another embodiment of the linked gaming machine system using an individual hit counter within each of the machines in the system.

FIGS. 3–5 are flowcharts of other methods performed by the linked gaming machine system 100 in FIG. 1. The identical structure may be used for the various methods described herein with a change in the program in ROM 126. In the various embodiments described, each linked gaming machine 101–108 is provided with its own display which displays not only conventional information such as the number of coins played, the number of stored points which can be redeemed for coins, and the present win amount, but also displays a bonus value common to all of the linked gaming machines in the system which will be described below.

In FIG. 3, steps are shown which are performed by both the individual linked gaming machines 101–108 and the common feature controller 110. The steps primarily controlled by the individual machines are indicated with an asterisk (*), and the steps primarily controlled by the feature controller 110 are identified with a pound sign (#). The flowchart illustrates the interaction between one gaming machine and the feature controller 110. Identical methods are performed for each of the linked gaming machines.

In step 300, a new game is initiated by a player of one of the linked gaming machines in the system. The new game may be initiated by the pulling of a handle, the insertion of a coin, the pressing of a button, or other conventional way of initiating a new game in a slot machine.

In step 304, at predetermined intervals, the feature controller 110 polls each of the gaming machines 101–108 for certain information. This polled information, in one embodiment, includes whether any symbol combination which has just been generated is a symbol combination which affects an accumulated bonus value common to all the linked gaming machines, to be described later. The feature controller 110 may poll a machine many times without the machine having been played since the last poll.

The new game may generate and display a symbol combination within a first group of combinations which provides the player an instant award, as in a conventional mode of play. The new game may also generate and display a combination of symbols within a second group of combinations which affects the accumulated common bonus value. For example, combinations within the first group of combinations may be conventional fruit-type combinations which typically pay money to the player, such as three bars, three plums, two cherries, or other conventional symbol combinations. Combinations within the second group of combinations are used by the feature controller 110 or the gaming machine itself in awarding a bonus award. These symbol combinations within the second group of combinations are, in the preferred embodiment, symbol combinations other than those in the first group of combinations. This second group of combinations may include combinations such as three special symbols which may or may not pay an instant reward. If the special symbols do not pay an instant award, these special symbols may take the place of what were previously losing symbols, such as three blanks or other losing symbols. These special symbol combinations are now utilized by the feature controller 110 in accumulating a common bonus value and awarding a bonus award as will be described below.

In step 308, it is determined whether the symbol combination generated by a particular linked gaming machine is a bonus hit (one of the combinations in the second group of combinations) or whether the combination is one of the winning combinations in the first group of combinations (step 312). Step 308 may be performed by either the individual machine or the common feature controller 110 and, in the preferred embodiment, is performed by the individual machine.

In step 314, if the symbol combination is determined to be a winner in step 312, a payout table within the gaming machine cross-references the symbol combination with the number of coins to be paid by that machine.

In step 316, if it is determined that the symbol combination is a combination within the second group of combinations, and is thus a bonus hit, the bonus hit value is added to a bonus counter value common to all the linked gaming machines. The value of the common bonus counter is displayed to the players of all the linked gaming machines either by a large display visible to all the players or by an individual display on each of the machines 101–108 so that the players know how close the common bonus value is to exceeding an award threshold, to be described below.

In the preferred embodiment, the combinations of symbols within the second group of combinations have different values depending upon the combination. Thus, each combination may increment the common bonus counter by a different amount.

In step 318, the sum of the bonus hit value by the individual machine plus the previous common bonus count is determined to be above or below a threshold value. In the embodiment shown in FIG. 3, this threshold value is 30; however, this threshold may be any amount.

If the total count is not greater than 30, the bonus hit by that machine did not cause the player to win a bonus award, and the previous common bonus count value is then incremented by the bonus hit value (step 320). This new common bonus value is then displayed (step 322) to all the players of the linked gaming machines.

The process is repeated for each of the gaming machines in the system as each machine is polled by the feature controller 110.

If it is determined that the bonus hit by the gaming machine caused the sum of the bonus hit value and the common bonus counter value to exceed the award threshold, then it is determined that the player who received the bonus hit is a bonus winner. Depending upon the implementation of the system, either the individual machine senses that the threshold is exceeded or the feature controller 110 senses that the threshold is exceeded. In either embodiment, a signal is transmitted to the CPU within the gaming machine to award the player a bonus award (step 314).

In step 326, the common bonus counter is reset to either a zero value or its value after being incremented by the bonus hit value minus 30.

Thus, players are provided with an incentive to keep playing the linked gaming machines since they have contributed to the growing common bonus counter value and will want to win the bonus award. The bonus award may be any amount, such as 100 coins.

One drawback of the embodiment of FIG. 3 is that players may elect not to play the linked gaming machines until they see that the bonus counter value is reaching the threshold. Then, when the bonus counter value is at for example 25, they begin playing the machines hoping to obtain a bonus hit which brings the total bonus value over the threshold. This gives an unfair advantage to those players who have not contributed to the bonus counter value. To provide an incentive to keep playing the linked gaming machines, a means is employed to give the players a form of credit which may be applied to the bonus hit value when attempting to exceed the bonus value threshold. This embodiment is illustrated in FIG. 4.

In FIG. 4, a new game on one of the linked gaming machines is initiated in step 300. The various linked gaming machines are polled (step 304) at predetermined intervals. The generated symbol combination is determined to be either a bonus hit, by being in a second group of combinations, or a normal winning combination, by being in a first group of combinations, as described with respect to FIG. 3 in steps 308, 312 and 314.

To eliminate any advantage in new players playing the linked gaming machines as the common bonus counter approaches the award threshold, each linked gaming machine is provided with an individual hit counter which is incremented by an amount relating to the number of bonus hits by that machine. In one embodiment, each bonus hit, irrespective of its value, increments the individual hit counter in that machine by a fixed value X (step 420). In another embodiment, the individual hit counter is incremented by a number relating to the value of the bonus hit.

In step 424, the bonus hit value is added to the common bonus counter value. In step 428, it is determined whether the sum of the common bonus counter value, the bonus hit value, and the individual hit count in the individual hit counter is equal to or greater than a predetermined award threshold, such as 30. If not, the common bonus counter is incremented by the bonus hit value in step 432 and the cycle is repeated. If the sum in step 428 is greater than or equal to 30, the player which obtained the bonus hit is determined to be a bonus winner, and the CPU within the linked gaming machine is instructed to pay the player the appropriate bonus award (step 314). In one embodiment, the determination of a bonus winner in step 428 is made internal to the particular linked gaming machine and, in another embodiment, the determination of a bonus winner is made by the feature controller 110.

In step 436, after a bonus award, the common bonus counter is reset to a zero count or a specified value is deducted from the common bonus counter to reflect the number of points needed for the player to meet the threshold of 30. The present count within the common bonus counter is displayed to all the players of the linked gaming machines.

In step 440, if the player relied upon the count within the individual hit counter to achieve the 30 points, the number of points needed from the hit counter is deducted from the hit counter within the machine.

The process is then repeated.

Figure 5A:
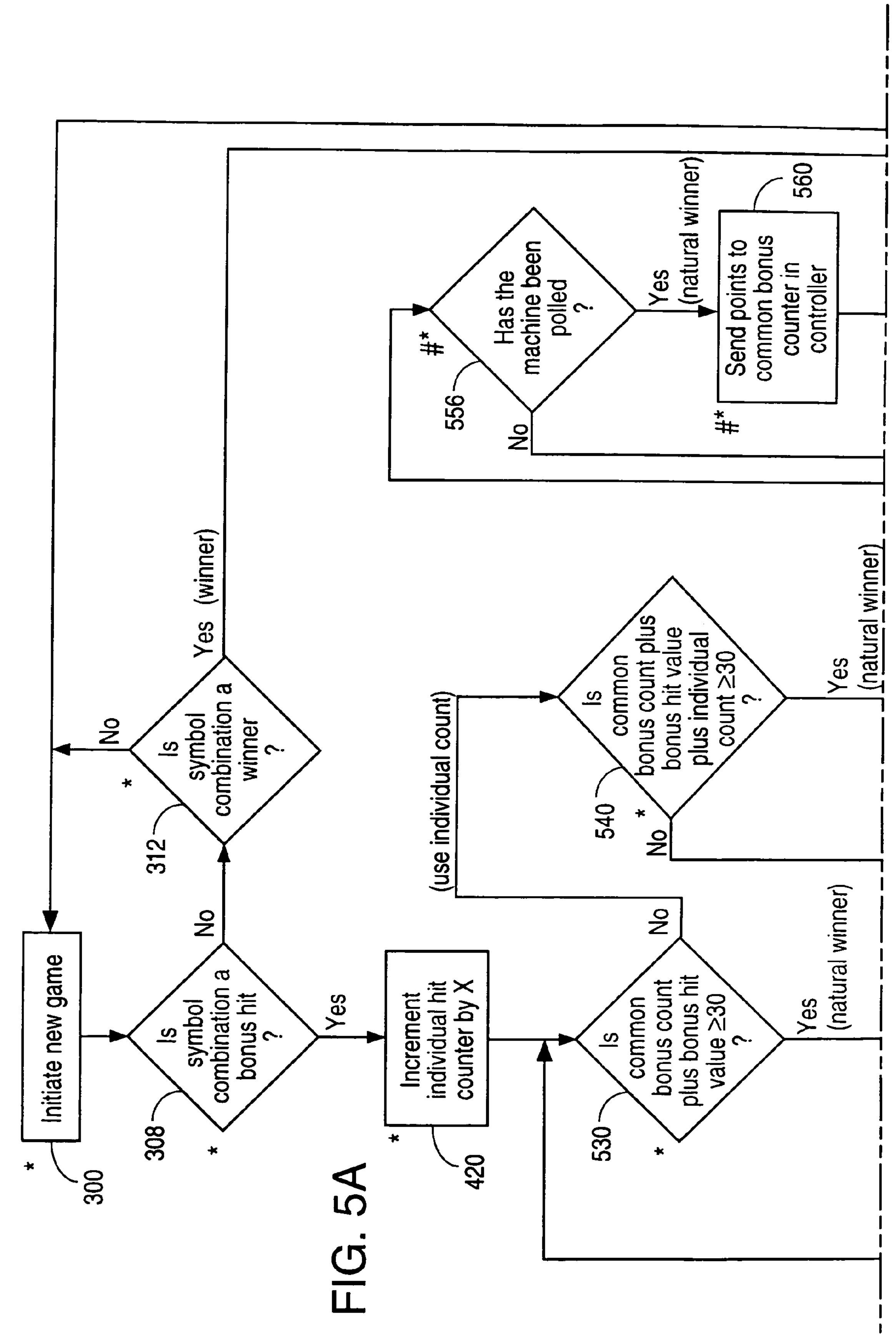
FIGS. 5A and 5B are a detailed flowchart of the preferred method performed by the linked gaming machine system.
Figure 5B:
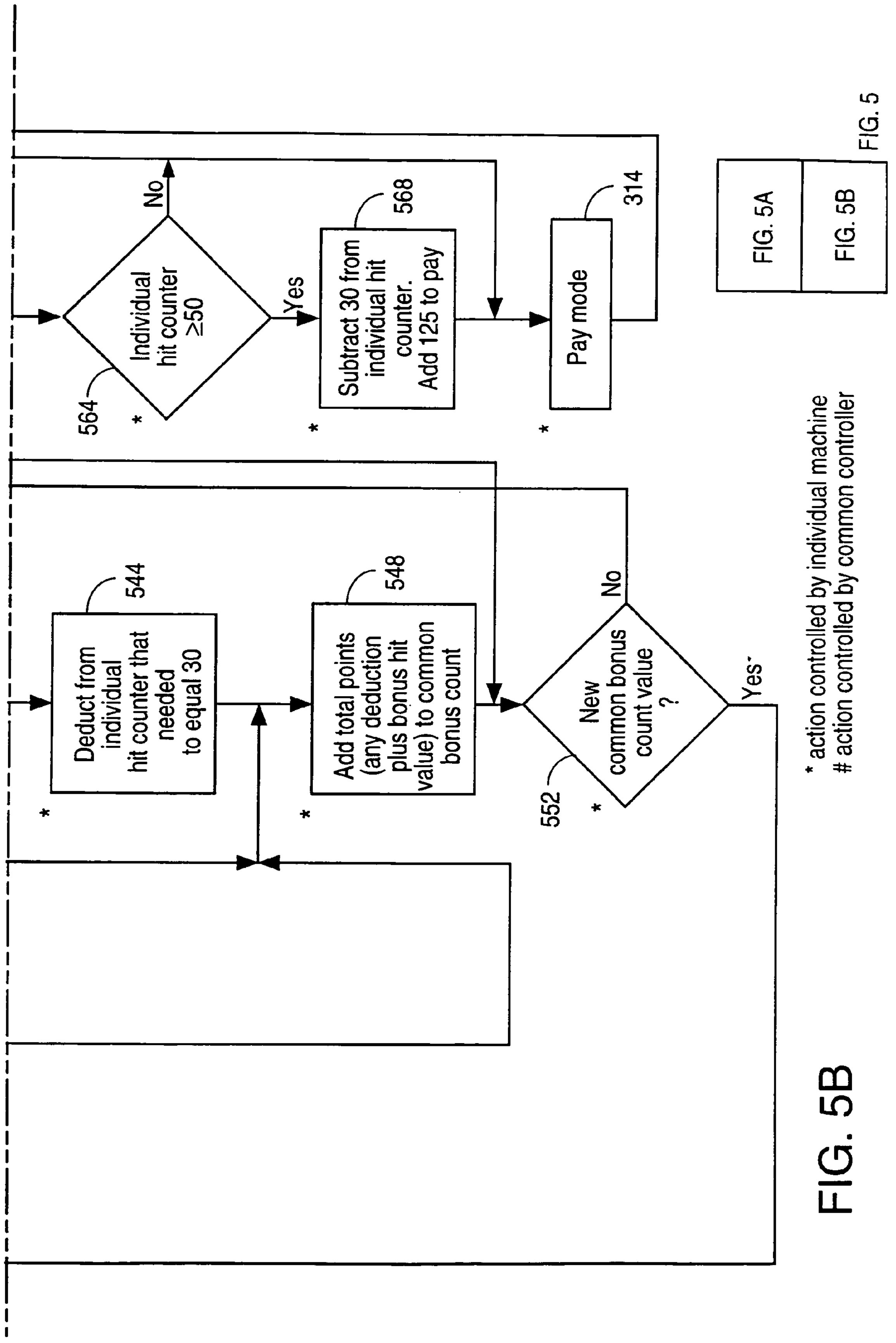

In FIGS. 5A and 5B, the general method of FIG. 4 is described but with several additional variations.

In FIG. 5A, a game on one of the linked gaming machines is initiated in step 300, and it is determined in step 308 whether the resulting symbol combination is a bonus hit, as previously described. If the symbol combination is not a bonus hit, it is determined in step 312 whether the combination is a normal winning combination. If it is determined that the combination is a normal winning combination, a signal is sent to the CPU of the gaming machine to pay out the appropriate number of coins to the player (step 314 in FIG. 5B). If the symbol combination is not a winning combination, the process is repeated.

As shown in step 420 in FIG. 5A, if it is determined that the combination is a bonus hit, then an individual hit counter within that particular gaming machine is incremented by a predetermined amount such as by one or a fraction. The value in the hit counter may be used later when determining whether a bonus will be awarded to the player.

In step 530, it is determined if the common bonus count, common to all of the linked gaming machines in the system, plus the bonus hit value is greater than or equal to a threshold, such as 30. If yes, the player is a natural winner of the bonus award, and the player is ultimately paid the bonus award.

If the common bonus count plus the bonus hit value does not equal or exceed the threshold, it is then determined whether the common bonus count plus the bonus hit value plus the individual count in the machine's hit counter is greater than or equal to the threshold of 30 (step 540). If the answer is yes, the player is a bonus winner. The count used by the player from the hit counter to reach the threshold is then deducted from the machine's individual hit counter (step 544 in FIG. 5B).

All the above actions are performed by the individual gaming machines, as indicated with the asterisk next to the step in FIGS. 5A and 5B. At this point in the process, the total points accumulated by the player from the bonus hit value and the individual hit counter are added to the common bonus count for the system (step 548 in FIG. 5B). If this process is being performed for the first time for that particular bonus hit, it will result in a new common bonus count value, and the process will then go back to step 530 to determine if the total now meets the threshold of 30. If this is the second reiteration, there will be no new common bonus count value, and the process continues on to the polling step 556.

Although polling may take place at any time, the gaming machines must wait for the feature controller 110 in FIG. 1 to poll the various machines in order to pay the bonus award by a particular machine and to update the common bonus counter. If no polling has taken place, the loop between step 552 and step 556 continues. If it is determined by the machine that it has been polled by the feature controller 110, the total points accumulated by the machine pursuant to the bonus hit (i.e., any deductions to the individual hit counter plus the bonus hit value) are sent to the common bonus counter in the feature controller 110 (step 560). The new common bonus count value is then displayed to all the players. This common bonus counter is simply a software counter implemented by CPU 122 and RAM 124 in the feature controller 110, as would be understood by those skilled in the art.

In step 564 of FIG. 5B, it is determined whether the individual hit counter in the machine is greater than or equal to a certain threshold, such as 50. It is desirable that the count in this individual hit counter be cashed in whenever possible for player satisfaction. If the individual hit counter is above this threshold, then the individual wins an additional bonus award, and a predetermined number of points, such as 30, are subtracted from the individual hit counter (step 568).

Based on the determinations in step 530, 540, and 548, the gaming machine which generated the particular bonus hit combination pays the bonus award to the player (step 314 of FIG. 5B).

The above process occurs for each of the individual linked gaming machines in the system.

Since the preferred common bonus counter in the feature controller 110 automatically rolls over (goes back to zero) after reaching the threshold of 30, there is no need for a separate step to reset the common bonus counter since it is automatically reset after 30.

The embodiments described above can be applied to linked gaming machines 101–108 (FIG. 1) which display symbols on rotating drums or reels or which display symbols on video screens. The symbols may include fruit-type symbols, playing cards, or any other symbols.

Figure 6:
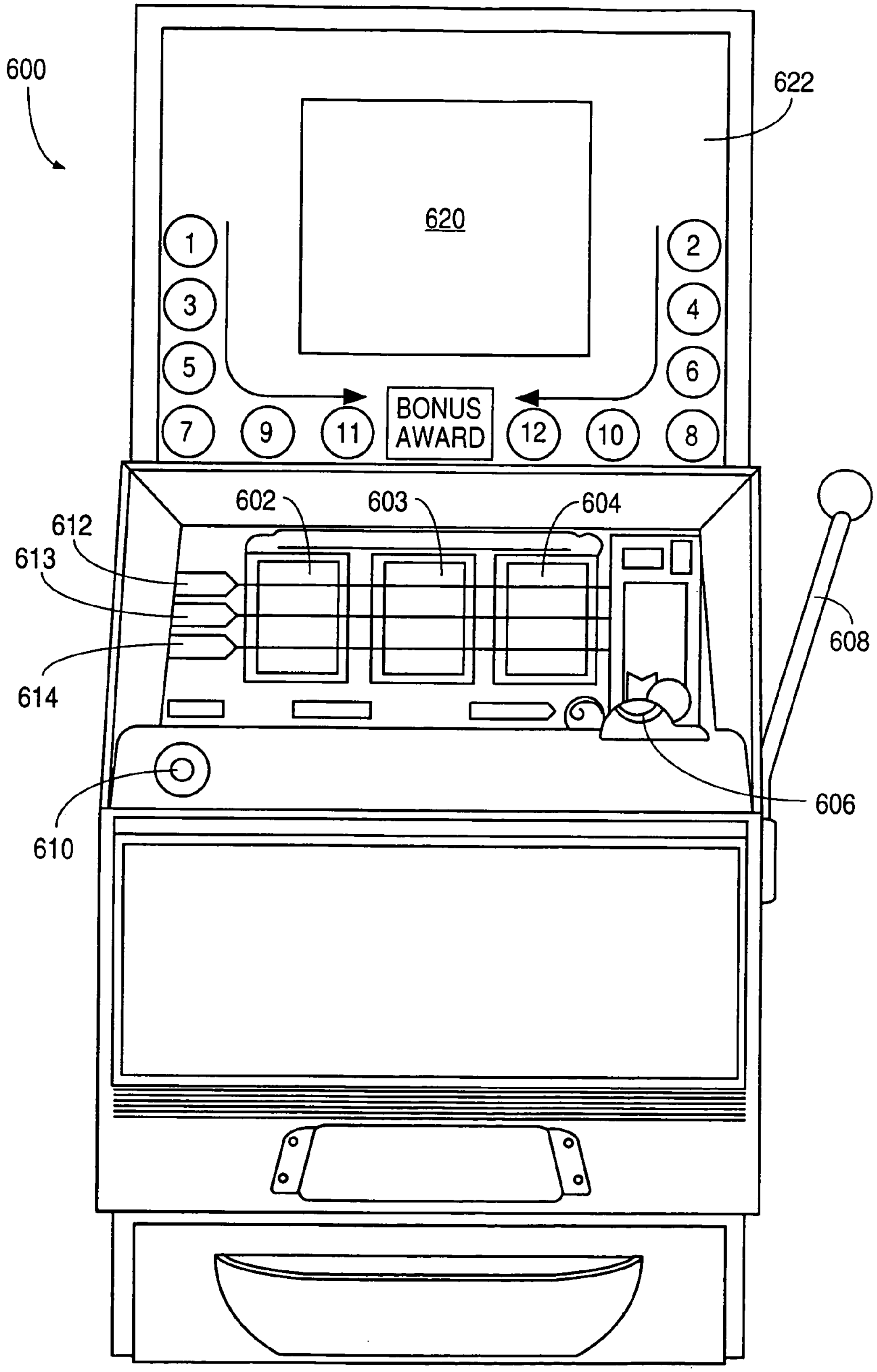
FIG. 6 is a front view of a slot machine incorporating one embodiment of the present invention.

FIG. 6 is one embodiment of a slot machine 600. Display windows 602, 603, 604 display portions of rotating reels or, alternatively, may be portions of a CRT. If the display is a CRT, then the bonus game, displayed on display glass 622 in FIG. 6, may be displayed on the same CRT as the main game.

Coins are deposited in coin slot 606, and a game is initiated by pulling on a handle 608 or by pressing a button 610. Three paylines 612, 613, 614 are shown, where the center payline 613 is activated by inserting one coin (or playing one credit), and paylines 612 and 614 are activated by inserting additional coins. In another embodiment, only a center payline 613 is used and additional coins will double or triple the award amount.

A central portion 620 of the display glass 622 provides general instructions for play and the paytable. The periphery of the display glass 622 shows the accumulated bonus common to all machines in the linked gaming system. An accumulated bonus count 1 through 12 is illuminated for all the machines in the linked system when that count is achieved by the various machines in the linked system generating a bonus hit combination. The first machine to cause the bonus count to reach 12 provides a bonus award to its player. The bonus count needed to reach the award criterion may be any number, and, in one embodiment is 30. Symbol combinations which are not bonus hit combinations but are a conventional instant win combination are also generated by the various machines. Thus, the players are winning conventional awards while also trying to win the bonus award. A bonus hit combination may also be an instant win combination or may be a special combination which does not provide an instant win.

Figure 7:
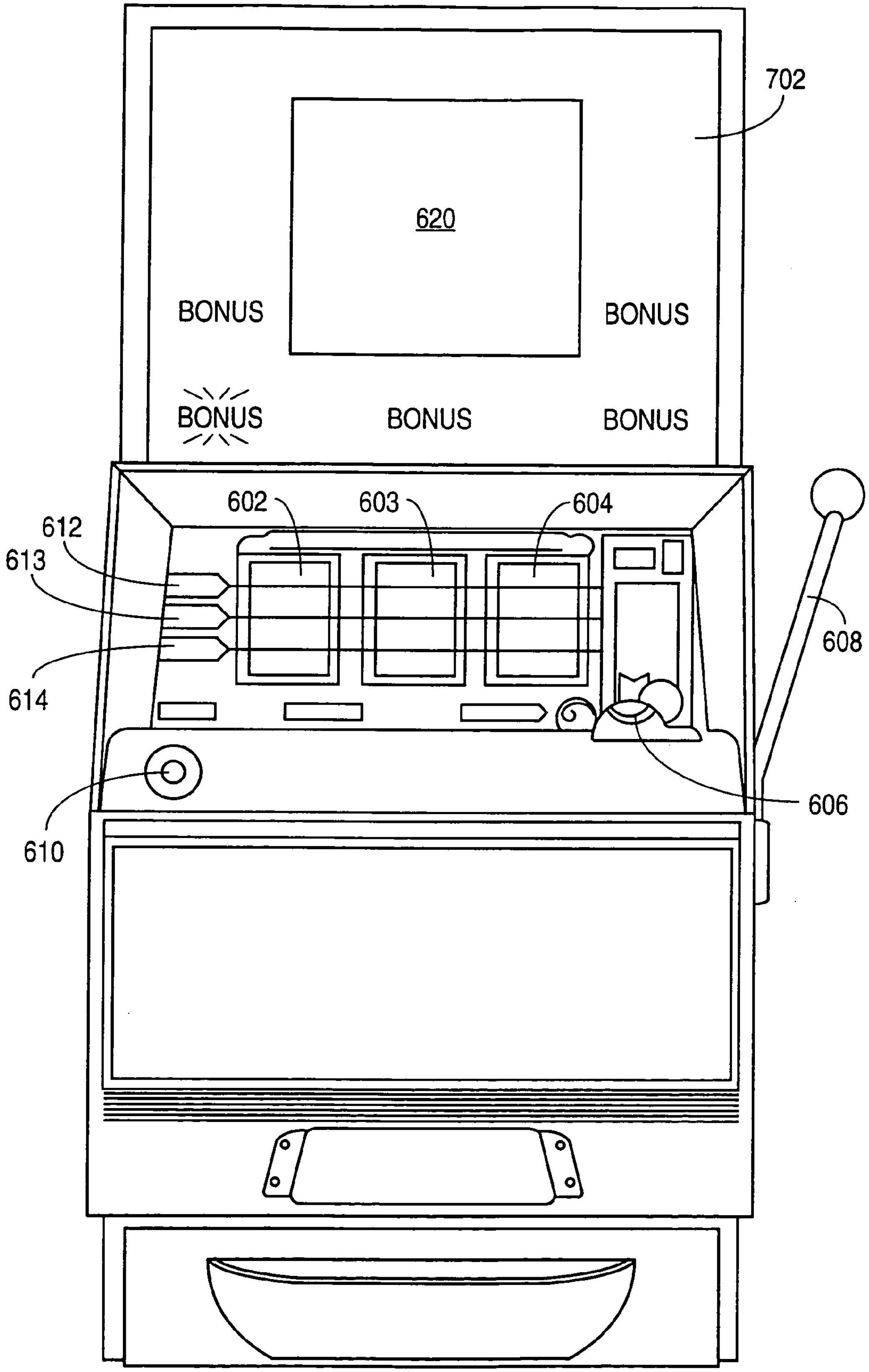
FIG. 7 is a front view of a slot machine incorporating another embodiment of the invention.

In another embodiment, shown in FIG. 7, the display glass 702 shows one blinking letter in one of a plurality of the word BONUS. This single blinking letter may be the letter N shown in the bottom left word BONUS in FIG. 7. In another embodiment, a plurality of letters may be blinking. If one of the linked gaming machines generates and displays a bonus hit combination while a letter is blinking, that blinking letter gets locked in and becomes constantly illuminated. Another letter then begins to blink. The display glass 702 for all the linked gaming machines have the same letters illuminated.

The player who completes the word BONUS by generating and displaying a bonus hit combination while the fifth letter in the word BONUS is blinking, that particular player receives a bonus award. The lights behind the fully completed word BONUS are then extinguished. In one embodiment, the illuminated letters in the other words BONUS remain lit.

The letters are not necessarily illuminated in the order B-O-N-U-S; the order of the letters may be randomly chosen. Any symbols or words may be used instead of the word BONUS. As with the embodiment of FIG. 6, the players may also generate symbol combinations which are instant win combinations.

Using the bonus feature described with respect to the various embodiments, players play the linked gaming machines longer with the expectation that they will hit a bonus award.

Figure 8:
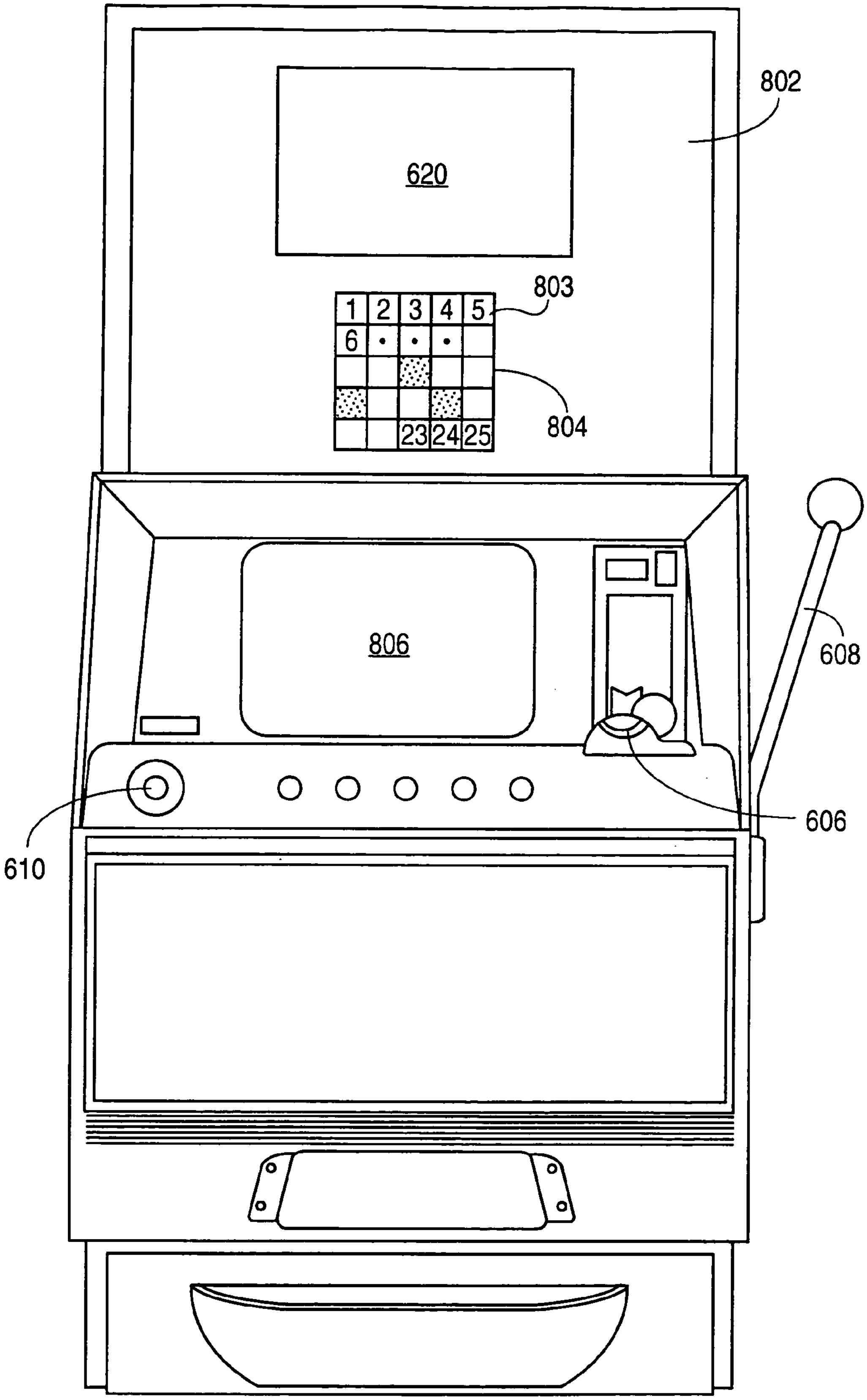
FIG. 8 is a front view of a slot machine incorporating another embodiment of the invention.

In another embodiment, shown in FIG. 8, the generation by any of the linked gaming machines of certain symbol combinations lights up a square (such as square 803) in a grid 804. The first player whose machine causes a full horizontal, vertical, or diagonal row of squares to be illuminated wins a bonus award, and the lights in either the winning row or the lights in the entire grid 804 are extinguished.

In one embodiment, each square in grid 804 corresponds to a particular combination of symbols. In the preferred embodiment, the slot machine of FIG. 8 is a video slot machine which displays poker hands on a CRT 806. Each four-of-a-kind is associated with a particular square; each flush suit has a square; and straights and full houses make up the remainder of the 25-square grid 804. In this embodiment, the symbol combinations which give rise to a square being lit also provide an instant win to the player. Other symbol combinations also provide an instant win but do not result in a square being lit.

In all embodiments described, the gaming machine may include a single CRT, or other video display, which displays both the main game and the bonus game. Other video displays may include LCD or thin film transistor displays. Furthermore, a stand-alone gaming machine, as opposed to a linked gaming machine, may utilize the bonus feature to provide incentive for a player to keep playing. The bonus award feature may be initiated by even one particular outcome of the main game, and the awarding of the bonus may be based upon a random outcome of a bonus game. The bonus game may even be a random multiplier of the base award in the main game or some other automated game.

Figure 9:
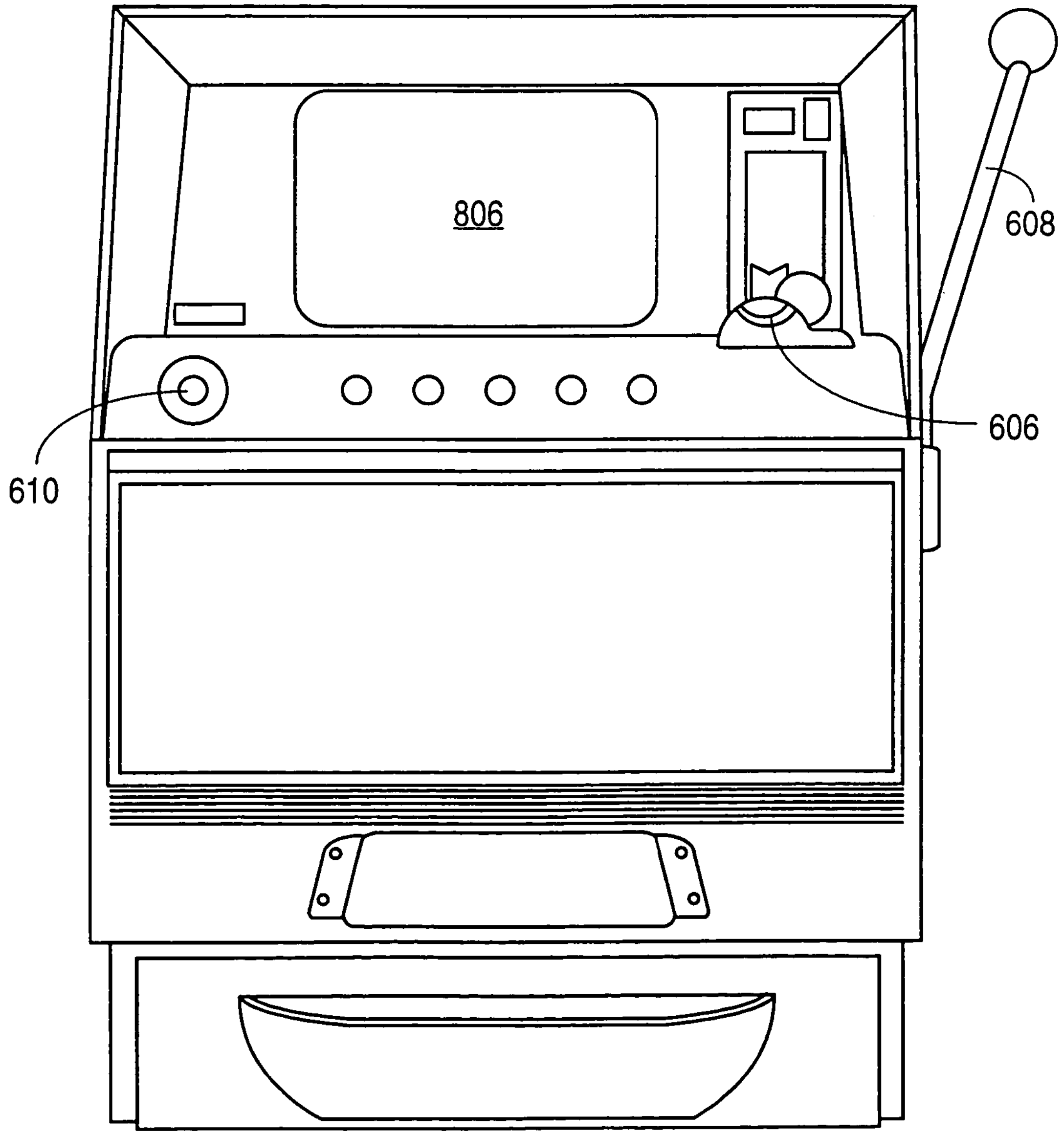
FIG. 9 is a front view of a video slot machine incorporating another embodiment of the invention.

FIG. 9 illustrates the machine of FIG. 8 except without a separate display for the bonus game. In FIG. 9, both the main game and the bonus game are displayed on the single CRT 806. The bonus game may be displayed in a separate section of the CRT 806 or may be displayed at intervals on the entire CRT display area.

Using the machine of FIG. 9, the main game and the bonus game are played using the same processor, memory, and other circuitry within the machine and, thus, no additional hardware is needed for playing and displaying the bonus game.

The bonus game can be played solely from the results of a single gaming machine or from a combination of results from linked gaming machines. If only one machine out of the linked machines is being played, the entire game, including bonus game, is played on a single machine.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A gaming method, comprising the steps of:

generating a first game, wherein a play in the first game comprises randomly generating a first game result;

associating a first particular game result with a win of the first game;

generating a bonus game, wherein the bonus game comprises non-randomly generating a bonus game result, and wherein non-randomly generating the bonus game result comprises associating a second particular first game result with generating a count value; and associating exceeding a particular count value with a win of the bonus game.

2. The method of claim 1, wherein non-randomly generating the bonus game result comprises:

associating a bonus hit value with the second particular first game result; and generating the count value by combining the bonus hit value with a common bonus counter value, wherein the common bonus counter value is associated with bonus hit values generated by one or more gaming machines in a system of linked gaming machines.

3. The method of claim 1, wherein non-randomly generating the bonus game result comprises:

associating a bonus hit value with the second particular first game result;

incrementing a hit counter value in a particular gaming machine; and generating the count value by combining the bonus hit value, the hit counter value, and a common bonus counter value, wherein the common bonus counter value is associated with bonus hit values generated by one or more gaming machines in a system of linked gaming machines, and wherein the system of linked gaming machines comprises the particular gaming machine.

4. The method of claim 1 further comprising:

associating a bonus hit value with the second particular first game result;

incrementing a hit counter in a particular gaming machine;

generating a first count value by combining the bonus hit value with a common bonus counter value, wherein the common bonus counter value is associated with bonus hit values generated by one or more gaming machines in a system of linked gaming machines, wherein the system of linked gaming machines comprises the particular gaming machine; and generating a second count value by combining the bonus hit value, the hit counter value, and a common bonus counter value, wherein the common bonus counter value is associated with bonus hit values generated by one or more gaming machines in the system of linked gaming machines, and wherein associating exceeding a particular count value with a win of the bonus game comprises exceeding the second particular count value;

wherein associating exceeding the particular count value with the win of the bonus game comprises the first count value exceeding a first particular count value or the second count value exceeding a second particular count value.

5. The method according to claim 1, wherein the generating and displaying the bonus game result is performed without requiring input from a player of a slot machine.

6. The method according to claim 1, wherein the generating the bonus game result is performed without requiring input from a player of the first game.

7. A method for playing a gaming apparatus, comprising the steps of;

generating a first game, wherein a play in the first game comprises randomly generating a first game result;

if the first game result matches a predetermined value, then initiating a bonus game, wherein said bonus game includes the steps of:

incrementing a count value;

determining if the count value exceeds a predetermined threshold;

generating and displaying a bonus game result associated with the count value; and awarding a win of the bonus game, if the count value exceeds the predetermined value, wherein generating the first game result and generating and displaying the bonus game result are performed in the gaming apparatus so as to require no additional hardware to generate and display the bonus game result.

8. The method according to claim 7, wherein the step of incrementing the count value includes the steps of:

retrieving a previous count value;

adding a predetermined amount to the previous count value to generate an incremented count value; and retaining the incremented count value.

9. The method according to claim 7, further comprising the step of:

resetting the count value to a predetermined amount if the win of the bonus game is awarded.

10. A networked gaming system comprising:

a plurality of gaming machines connected together;

a central counter coupled with each gaming machine; and each gaming machine including:

circuitry configured to generate a first game result by displaying a randomly selected combination of symbols;

a video display screen for displaying the first game result;

an individual counter;

said circuitry configured to initiate a bonus game if said first game result matches a predetermined value, said bonus game being other than a random game, which increments the individual counter; and said circuitry further configured to compare the sum of the individual counter and the central counter to a predetermined threshold and either award a bonus game win if the threshold is satisfied or increment the central counter if the threshold is not satisfied.

11. The networked gaming system according to claim 10, wherein the circuitry is further configured to perform the award of the bonus game win and the increment of the central counter without requiring input from a player of any of the gaming machines.

* * * * *